(12) United States Patent
Pandit et al.

(10) Patent No.: US 11,741,145 B1
(45) Date of Patent: Aug. 29, 2023

(54) METHOD AND SYSTEM FOR CLASSIFICATION OF UNSTRUCTURED DATA ITEMS

(71) Applicant: Veritas Technologies LLC, Mountain View, CA (US)

(72) Inventors: Bhushan Pandit, Maharashtra (IN); Surashree Kane, Maharashtra (IN); Abhishek Shinde, Maharashtra (IN)

(73) Assignee: Veritas Technologies LLC, Santa Clara, CA (US)

(*) Notice: Subject to any disclaimer, the term of this patent is extended or adjusted under 35 U.S.C. 154(b) by 824 days.

(21) Appl. No.: 16/147,822

(22) Filed: Sep. 30, 2018

(51) Int. Cl.
*G06F 16/00* (2019.01)
*G06F 7/00* (2006.01)
*G06F 16/35* (2019.01)
*G06F 16/31* (2019.01)

(52) U.S. Cl.
CPC .......... *G06F 16/355* (2019.01); *G06F 16/313* (2019.01)

(58) Field of Classification Search
CPC .............................. G06F 16/355; G06F 16/313
USPC ........................................................ 707/738
See application file for complete search history.

(56) References Cited

U.S. PATENT DOCUMENTS

| | | | | |
|---|---|---|---|---|
| 7,536,413 | B1* | 5/2009 | Mohan | G06F 16/355 |
| 9,785,833 | B1* | 10/2017 | Price | G06K 9/6215 |
| 2009/0313706 | A1* | 12/2009 | Zhang | G06F 16/3341 |
| | | | | 726/30 |
| 2011/0219000 | A1* | 9/2011 | Kusumura | G06F 16/3346 |
| | | | | 707/750 |
| 2013/0282730 | A1* | 10/2013 | Gherman | G06F 16/40 |
| | | | | 707/741 |
| 2014/0236902 | A1* | 8/2014 | Zhu | G06F 11/1464 |
| | | | | 707/654 |
| 2014/0344195 | A1* | 11/2014 | Drew | G06F 16/35 |
| | | | | 706/12 |
| 2019/0095450 | A1* | 3/2019 | Dhanasekaran | G06F 16/168 |

* cited by examiner

*Primary Examiner* — Raquel Perez-Arroyo
(74) *Attorney, Agent, or Firm* — Womble Bond Dickinson (US) LLP

(57) ABSTRACT

Methods, computer program products, and computer systems for the classification of unstructured data items are disclosed. Such methods, computer program products, and computer systems include ingesting an item into a classification engine, performing term processing on one or more terms of the item, and processing a relational similarity index. The classification engine is implemented in the computer system. The relational similarity index represents a similarity of the item to a reference item, and the relational similarity index is determined using the one or more terms.

20 Claims, 13 Drawing Sheets

Item Pair List
600

| Pair Information 610(1) | Ranking Value 620(1) |
|---|---|
| Pair Information 610(2) | Ranking Value 620(2) |
| Pair Information 610(3) | Ranking Value 620(3) |
| ⋮ | ⋮ |
| Pair Information 610(N) | Ranking Value 620(N) |

*Fig. 6*

Global Pair List
600

| Global Pair Information 610(1) | Global Ranking Value 620(1) |
|---|---|
| Global Pair Information 610(2) | Global Ranking Value 620(2) |
| Global Pair Information 610(3) | Global Ranking Value 620(3) |

⋮

| Global Pair Information 610(N) | Global Ranking Value 620(N) |
|---|---|

*Fig. 7*

| Document Category | | I-1 | I-2 | I-3 | I-4 | I-5 | I-6 | I-7 | I-8 | I-9 | I-10 | I-11 | I-12 | I-13 | I-14 | I-15 | I-16 | I-17 | I-18 | I-19 | I-20 | I-21 | I-22 | I-23 |
|---|---|---|---|---|---|---|---|---|---|---|---|---|---|---|---|---|---|---|---|---|---|---|---|---|
| | | Biochemistry | | | | | Economics | | | | | Geophysics | | | | | Optimization | | | | Psychology | | | |
| Biochemistry | I-1 | 101 | 77 | 77 | 100 | 79 | 53 | 42 | 45 | 40 | 38 | 41 | 49 | 50 | 49 | 32 | 38 | 47 | 39 | 54 | 56 | 53 | 44 | 49 |
| | I-2 | 69 | 101 | 100 | 66 | 64 | 35 | 30 | 33 | 27 | 30 | 28 | 35 | 29 | 33 | 15 | 30 | 42 | 26 | 40 | 45 | 47 | 36 | 37 |
| | I-3 | 69 | 100 | 101 | 66 | 64 | 35 | 30 | 33 | 27 | 30 | 28 | 35 | 29 | 33 | 15 | 30 | 42 | 26 | 40 | 45 | 47 | 36 | 37 |
| | I-4 | 100 | 81 | 81 | 101 | 80 | 62 | 52 | 55 | 47 | 42 | 41 | 58 | 55 | 46 | 34 | 53 | 57 | 48 | 60 | 52 | 61 | 50 | 55 |
| | I-5 | 100 | 91 | 91 | 96 | 101 | 57 | 48 | 51 | 52 | 42 | 42 | 59 | 49 | 43 | 19 | 45 | 54 | 48 | 56 | 59 | 62 | 51 | 57 |
| Economics | I-6 | 52 | 38 | 38 | 60 | 45 | 101 | 94 | 100 | 78 | 73 | 43 | 46 | 44 | 48 | 41 | 53 | 63 | 51 | 55 | 55 | 54 | 56 | 57 |
| | I-7 | 39 | 34 | 34 | 49 | 34 | 100 | 101 | 86 | 67 | 62 | 36 | 38 | 35 | 37 | 35 | 53 | 61 | 46 | 53 | 43 | 49 | 49 | 52 |
| | I-8 | 44 | 35 | 35 | 53 | 38 | 100 | 82 | 101 | 69 | 66 | 34 | 46 | 40 | 36 | 28 | 44 | 45 | 40 | 54 | 43 | 53 | 47 | 47 |
| | I-9 | 52 | 41 | 41 | 58 | 53 | 100 | 82 | 87 | 101 | 83 | 59 | 58 | 44 | 50 | 25 | 49 | 56 | 50 | 77 | 51 | 70 | 78 | 87 |
| | I-10 | 56 | 47 | 47 | 61 | 44 | 100 | 88 | 86 | 91 | 101 | 50 | 50 | 43 | 48 | 40 | 51 | 67 | 48 | 69 | 61 | 68 | 75 | 73 |
| Geophysics | I-11 | 71 | 56 | 56 | 63 | 54 | 72 | 63 | 64 | 72 | 62 | 101 | 98 | 76 | 100 | 12 | 61 | 68 | 43 | 77 | 61 | 71 | 76 | 84 |
| | I-12 | 62 | 44 | 44 | 58 | 51 | 56 | 41 | 52 | 45 | 40 | 66 | 101 | 100 | 87 | 32 | 44 | 54 | 40 | 52 | 45 | 57 | 46 | 52 |
| | I-13 | 54 | 36 | 36 | 52 | 42 | 46 | 36 | 46 | 38 | 34 | 46 | 100 | 101 | 65 | 25 | 38 | 49 | 21 | 53 | 40 | 50 | 42 | 48 |
| | I-14 | 56 | 43 | 43 | 49 | 38 | 53 | 42 | 39 | 42 | 41 | 67 | 100 | 71 | 101 | 15 | 38 | 55 | 34 | 51 | 46 | 53 | 48 | 45 |
| | I-15 | 39 | 21 | 21 | 44 | 18 | 56 | 44 | 39 | 23 | 36 | 8 | 38 | 29 | 17 | 101 | 63 | 100 | 72 | 46 | 43 | 49 | 34 | 38 |
| Optimization | I-16 | 41 | 35 | 35 | 55 | 33 | 55 | 50 | 50 | 38 | 39 | 32 | 40 | 35 | 33 | 49 | 101 | 100 | 81 | 51 | 63 | 52 | 52 | 49 |
| | I-17 | 50 | 44 | 44 | 59 | 39 | 63 | 58 | 49 | 43 | 48 | 35 | 49 | 44 | 43 | 79 | 100 | 101 | 85 | 52 | 67 | 54 | 53 | 53 |
| | I-18 | 51 | 33 | 33 | 57 | 41 | 62 | 53 | 55 | 44 | 38 | 27 | 43 | 21 | 33 | 64 | 93 | 100 | 101 | 51 | 70 | 48 | 52 | 48 |
| Psychology | I-19 | 60 | 49 | 49 | 60 | 48 | 67 | 61 | 58 | 61 | 59 | 52 | 53 | 54 | 52 | 41 | 51 | 58 | 51 | 101 | 77 | 91 | 100 | 88 |
| | I-20 | 62 | 52 | 52 | 58 | 47 | 66 | 52 | 51 | 45 | 51 | 38 | 54 | 40 | 45 | 37 | 71 | 78 | 69 | 76 | 101 | 100 | 66 | 67 |
| | I-21 | 62 | 55 | 55 | 65 | 48 | 65 | 59 | 58 | 60 | 59 | 49 | 61 | 51 | 50 | 44 | 52 | 55 | 44 | 99 | 100 | 101 | 90 | 98 |
| | I-22 | 48 | 42 | 42 | 49 | 42 | 62 | 55 | 54 | 61 | 63 | 52 | 47 | 42 | 45 | 29 | 55 | 58 | 50 | 100 | 65 | 83 | 101 | 94 |
| | I-23 | 55 | 43 | 43 | 53 | 44 | 67 | 60 | 55 | 67 | 59 | 54 | 49 | 48 | 46 | 33 | 53 | 60 | 42 | 86 | 68 | 100 | 95 | 101 |

*Fig. 8A*

| Document Category | Biochemistry | | | | | Economics | | | | | Geophysics | | | | Optimization | | | | Psychology | | | | |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Biochemistry | | | | | | | | | | | | | | | | | | | | | | | |
| 1=>4 | 101 | 85 | 85 | 101 | 100 | 0 | 0 | 0 | 0 | 14 | 0 | 0 | 0 | 0 | 0 | 0 | 0 | 0 | 14 | 0 | 14 | 0 | 0 |
| 2=>3 | 66 | 101 | 101 | 83 | 100 | 0 | 0 | 0 | 0 | 0 | 0 | 0 | 0 | 0 | 0 | 0 | 16 | 0 | 0 | 33 | 33 | 0 | 16 |
| 3=>2 | 66 | 101 | 101 | 83 | 100 | 0 | 0 | 0 | 0 | 0 | 0 | 0 | 0 | 0 | 0 | 0 | 16 | 0 | 0 | 33 | 33 | 0 | 16 |
| 4=>1 | 101 | 100 | 100 | 101 | 100 | 0 | 0 | 0 | 0 | 0 | 0 | 0 | 0 | 0 | 0 | 0 | 0 | 0 | 0 | 0 | 16 | 0 | 16 |
| 5=>1 | 101 | 61 | 61 | 100 | 101 | 7 | 0 | 0 | 0 | 0 | 7 | 7 | 15 | 0 | 7 | 0 | 7 | 0 | 0 | 15 | 23 | 0 | 0 |
| Economics | | | | | | | | | | | | | | | | | | | | | | | |
| 6=>8 | 6 | 0 | 0 | 6 | 0 | 101 | 100 | 101 | 86 | 46 | 6 | 0 | 0 | 0 | 0 | 6 | 0 | 6 | 6 | 6 | 6 | 0 | 6 |
| 7=>6 | 0 | 0 | 0 | 12 | 0 | 101 | 101 | 100 | 87 | 50 | 12 | 0 | 12 | 0 | 0 | 0 | 20 | 0 | 12 | 0 | 12 | 0 | 12 |
| 8=>6 | 0 | 0 | 0 | 15 | 0 | 101 | 92 | 101 | 100 | 76 | 0 | 7 | 0 | 12 | 15 | 0 | 37 | 0 | 7 | 0 | 7 | 0 | 0 |
| 9=>6 | 16 | 0 | 0 | 16 | 16 | 101 | 50 | 100 | 101 | 75 | 8 | 16 | 0 | 0 | 8 | 8 | 7 | 8 | 33 | 0 | 33 | 50 | 66 |
| 10=>6 | 0 | 0 | 7 | 23 | 0 | 101 | 76 | 84 | 100 | 101 | 23 | 7 | 0 | 0 | 0 | 7 | 0 | 0 | 23 | 15 | 15 | 38 | 53 |
| Geophysics | | | | | | | | | | | | | | | | | | | | | | | |
| 11=>14 | 50 | 50 | 50 | 16 | 16 | 41 | 16 | 8 | 25 | 16 | 101 | 100 | 58 | 101 | 0 | 8 | 41 | 8 | 66 | 16 | 33 | 50 | 41 |
| 12=>13 | 28 | 0 | 0 | 0 | 22 | 0 | 0 | 0 | 0 | 0 | 57 | 101 | 101 | 100 | 33 | 0 | 0 | 100 | 14 | 0 | 28 | 0 | 0 |
| 13=>12 | 16 | 0 | 0 | 16 | 0 | 0 | 0 | 0 | 16 | 0 | 33 | 101 | 101 | 100 | 25 | 0 | 0 | 100 | 0 | 0 | 33 | 0 | 0 |
| 14=>12 | 18 | 0 | 0 | 9 | 18 | 0 | 0 | 0 | 0 | 9 | 54 | 101 | 100 | 101 | 63 | 9 | 18 | 101 | 9 | 0 | 18 | 9 | 0 |
| Optimization | | | | | | | | | | | | | | | | | | | | | | | |
| 15=>17 | 44 | 0 | 0 | 66 | 11 | 44 | 33 | 44 | 0 | 22 | 0 | 0 | 22 | 0 | 0 | 0 | 0 | 0 | 55 | 22 | 55 | 22 | 11 |
| 16=>17 | 11 | 0 | 0 | 44 | 22 | 11 | 11 | 44 | 0 | 11 | 0 | 22 | 11 | 0 | 0 | 77 | 101 | 100 | 22 | 44 | 33 | 11 | 22 |
| 17=>16 | 12 | 0 | 0 | 75 | 0 | 12 | 37 | 25 | 12 | 25 | 0 | 0 | 12 | 0 | 25 | 101 | 101 | 100 | 12 | 25 | 25 | 0 | 37 |
| 18=>17 | 18 | 0 | 0 | 27 | 18 | 36 | 27 | 36 | 0 | 9 | 0 | 9 | 0 | 0 | 63 | 100 | 101 | 101 | 18 | 45 | 27 | 9 | 9 |
| Psychology | | | | | | | | | | | | | | | | | | | | | | | |
| 19=>22 | 0 | 0 | 18 | 9 | 9 | 9 | 0 | 0 | 0 | 9 | 9 | 0 | 0 | 0 | 0 | 0 | 0 | 9 | 101 | 54 | 100 | 101 | 81 |
| 20=>21 | 33 | 18 | 50 | 50 | 16 | 50 | 16 | 0 | 16 | 0 | 0 | 33 | 0 | 0 | 0 | 101 | 33 | 11 | 100 | 101 | 101 | 50 | 83 |
| 21=>20 | 22 | 11 | 11 | 11 | 11 | 44 | 44 | 22 | 11 | 22 | 0 | 11 | 0 | 0 | 0 | 101 | 11 | 0 | 100 | 101 | 101 | 88 | 100 |
| 22=>19 | 0 | 0 | 0 | 0 | 0 | 28 | 14 | 7 | 14 | 42 | 21 | 0 | 7 | 0 | 0 | 0 | 21 | 0 | 101 | 21 | 100 | 101 | 100 |
| 23=>21 | 8 | 0 | 0 | 0 | 0 | 8 | 8 | 0 | 0 | 8 | 0 | 0 | 16 | 0 | 0 | 7 | 16 | 0 | 58 | 8 | 101 | 100 | 101 |

*Fig. 8B*

| Document Category | | Biochemistry | | | | | | | | | | Economics | | | | | | | | | | Geophysics | | | | | | | | Optimization | | | | | | | | Psychology | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | | 1A | 1B | 2A | 2B | 3A | 3B | 4A | 4B | 5A | 5B | 6A | 6B | 7A | 7B | 8A | 8B | 9A | 9B | 10A | 10B | 11A | 11B | 12A | 12B | 13A | 13B | 14A | 14B | 15A | 15B | 16A | 16B | 17A | 17B | 18A | 18B | 19A | 19B | 20A | 20B | 21A | 21B | 22A | 22B | 23A | 23B |
| Biochemistry | 1=>4 | 101 | 101 | 85 | 85 | 85 | 85 | 101 | 101 | 100 | 85 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 14 | 0 | 0 | 0 | 14 |
| | 2=>3 | 66 | 66 | 101 | 101 | 101 | 101 | 83 | 83 | 100 | 100 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 16 | 16 | 0 | 0 | 0 | 0 | 33 | 33 | 33 | 33 | 0 | 0 | 16 | 16 |
| | 3=>2 | 66 | 66 | 101 | 101 | 101 | 101 | 83 | 83 | 100 | 100 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 16 | 16 | 0 | 0 | 0 | 0 | 33 | 33 | 33 | 33 | 0 | 0 | 16 | 16 |
| | 4=>1 | 101 | 101 | 85 | 85 | 85 | 85 | 101 | 101 | 85 | 100 | 0 | 0 | 0 | 0 | 0 | 0 | 0 | 0 | 14 | 0 | 0 | 0 | 0 | 0 | 0 | 0 | 0 | 0 | 0 | 0 | 0 | 0 | 0 | 0 | 0 | 0 | 0 | 14 | 0 | 0 | 0 | 14 | 0 | 14 | 0 | 0 |
| | 5=>1 | 101 | 101 | 61 | 69 | 61 | 69 | 100 | 53 | 101 | 101 | 0 | 0 | 0 | 0 | 7 | 0 | 0 | 0 | 0 | 0 | 7 | 7 | 7 | 7 | 7 | 15 | 0 | 0 | 7 | 0 | 7 | 7 | 7 | 0 | 0 | 0 | 0 | 7 | 15 | 7 | 23 | 23 | 0 | 7 | 0 | 0 |
| Economics | 6=>8 | 6 | 0 | 0 | 0 | 0 | 0 | 6 | 13 | 0 | 0 | 0 | 101 | 101 | 80 | 101 | 101 | 86 | 86 | 46 | 66 | 6 | 0 | 6 | 6 | 6 | 0 | 6 | 0 | 0 | 0 | 6 | 6 | 6 | 6 | 6 | 0 | 6 | 6 | 6 | 0 | 6 | 6 | 0 | 0 | 6 | 0 |
| | 7=>6 | 0 | 6 | 0 | 0 | 0 | 0 | 6 | 13 | 0 | 0 | 101 | 101 | 101 | 101 | 53 | 100 | 46 | 60 | 26 | 46 | 6 | 6 | 6 | 6 | 6 | 0 | 6 | 0 | 0 | 0 | 6 | 20 | 6 | 20 | 6 | 0 | 6 | 13 | 0 | 6 | 0 | 0 | 0 | 0 | 6 | 6 |
| | 8=>6 | 0 | 6 | 0 | 0 | 0 | 0 | 0 | 6 | 0 | 0 | 0 | 101 | 101 | 80 | 101 | 101 | 86 | 86 | 66 | 46 | 0 | 6 | 6 | 6 | 0 | 0 | 6 | 0 | 0 | 0 | 13 | 0 | 6 | 20 | 6 | 0 | 6 | 6 | 0 | 0 | 6 | 6 | 0 | 0 | 6 | 6 |
| | 9=>6 | 15 | 7 | 0 | 0 | 0 | 7 | 0 | 7 | 15 | 0 | 0 | 101 | 101 | 46 | 69 | 92 | 100 | 101 | 69 | 92 | 7 | 7 | 7 | 7 | 15 | 0 | 0 | 0 | 0 | 0 | 7 | 15 | 0 | 7 | 7 | 0 | 30 | 15 | 15 | 0 | 30 | 7 | 46 | 0 | 61 | 7 |
| | 10=>6 | 0 | 15 | 0 | 0 | 0 | 7 | 0 | 23 | 15 | 0 | 7 | 101 | 101 | 76 | 53 | 84 | 53 | 100 | 92 | 101 | 23 | 7 | 7 | 15 | 7 | 15 | 0 | 0 | 0 | 0 | 0 | 15 | 7 | 7 | 0 | 7 | 7 | 23 | 15 | 0 | 15 | 15 | 0 | 38 | 53 | 15 |
| Geophysics | 11=>14 | 54 | 18 | 54 | 18 | 54 | 18 | 18 | 36 | 18 | 18 | 45 | 18 | 18 | 27 | 9 | 0 | 27 | 9 | 18 | 36 | 0 | 57 | 28 | 101 | 101 | 100 | 63 | 81 | 101 | 101 | 11 | 77 | 9 | 18 | 9 | 0 | 63 | 36 | 18 | 36 | 27 | 54 | 36 | 45 | 0 | 9 |
| | 12=>13 | 28 | 14 | 0 | 0 | 0 | 0 | 14 | 0 | 0 | 14 | 0 | 0 | 0 | 0 | 0 | 0 | 0 | 14 | 0 | 0 | 0 | 57 | 28 | 101 | 101 | 100 | 101 | 101 | 100 | 85 | 0 | 0 | 14 | 0 | 0 | 0 | 14 | 14 | 0 | 28 | 28 | 0 | 0 | 0 | 0 | 0 |
| | 13=>12 | 14 | 28 | 0 | 0 | 0 | 0 | 0 | 6 | 0 | 0 | 0 | 0 | 0 | 0 | 0 | 0 | 0 | 0 | 0 | 0 | 0 | 28 | 57 | 101 | 101 | 101 | 85 | 101 | 85 | 100 | 0 | 22 | 0 | 0 | 0 | 0 | 0 | 14 | 0 | 0 | 0 | 28 | 0 | 0 | 0 | 0 |
| | 14=>12 | 18 | 36 | 0 | 0 | 0 | 0 | 9 | 7 | 18 | 0 | 0 | 0 | 0 | 0 | 0 | 0 | 0 | 0 | 9 | 0 | 0 | 54 | 45 | 101 | 101 | 100 | 63 | 101 | 101 | 101 | 0 | 0 | 0 | 18 | 0 | 0 | 9 | 18 | 0 | 0 | 18 | 9 | 0 | 0 | 9 | 0 |
| Optimization | 15=>17 | 44 | 11 | 0 | 0 | 0 | 0 | 66 | 33 | 11 | 0 | 44 | 44 | 33 | 33 | 44 | 33 | 0 | 11 | 22 | 11 | 0 | 0 | 33 | 22 | 22 | 11 | 0 | 0 | 0 | 11 | 101 | 101 | 22 | 101 | 100 | 88 | 55 | 44 | 22 | 11 | 55 | 44 | 22 | 11 | 0 | 11 |
| | 16=>17 | 11 | 11 | 0 | 0 | 0 | 0 | 44 | 66 | 22 | 0 | 11 | 11 | 11 | 33 | 44 | 22 | 0 | 0 | 11 | 22 | 0 | 0 | 0 | 0 | 11 | 0 | 0 | 0 | 0 | 0 | 101 | 101 | 101 | 101 | 100 | 88 | 22 | 11 | 44 | 22 | 33 | 22 | 0 | 0 | 22 | 33 |
| | 17=>16 | 11 | 11 | 0 | 0 | 0 | 0 | 66 | 44 | 22 | 22 | 11 | 11 | 11 | 11 | 22 | 44 | 11 | 0 | 22 | 11 | 21 | 0 | 22 | 0 | 22 | 0 | 0 | 0 | 22 | 33 | 101 | 101 | 101 | 101 | 88 | 100 | 11 | 22 | 22 | 44 | 22 | 33 | 11 | 0 | 33 | 22 |
| | 18=>17 | 18 | 9 | 0 | 0 | 0 | 0 | 27 | 36 | 18 | 0 | 36 | 27 | 36 | 27 | 36 | 27 | 0 | 9 | 18 | 0 | 0 | 21 | 0 | 9 | 0 | 9 | 0 | 0 | 0 | 0 | 101 | 101 | 101 | 101 | 101 | 101 | 18 | 18 | 45 | 27 | 18 | 18 | 0 | 9 | 9 | 18 |
| Psychology | 19=>22 | 0 | 0 | 14 | 0 | 14 | 0 | 7 | 0 | 7 | 0 | 7 | 28 | 0 | 14 | 0 | 7 | 0 | 14 | 7 | 42 | 7 | 0 | 0 | 0 | 0 | 0 | 0 | 0 | 0 | 0 | 0 | 0 | 0 | 7 | 7 | 0 | 101 | 101 | 42 | 21 | 78 | 100 | 101 | 64 | 85 |
| | 20=>21 | 33 | 33 | 50 | 16 | 50 | 16 | 50 | 16 | 16 | 16 | 50 | 66 | 16 | 66 | 0 | 33 | 16 | 16 | 0 | 33 | 0 | 0 | 0 | 16 | 0 | 0 | 0 | 0 | 0 | 0 | 33 | 16 | 33 | 0 | 16 | 16 | 100 | 66 | 101 | 101 | 101 | 101 | 50 | 66 | 83 | 66 |
| | 21=>20 | 33 | 33 | 16 | 50 | 16 | 50 | 16 | 50 | 16 | 16 | 66 | 50 | 66 | 16 | 33 | 0 | 16 | 16 | 33 | 0 | 0 | 0 | 0 | 0 | 0 | 0 | 0 | 0 | 0 | 0 | 16 | 33 | 0 | 0 | 0 | 0 | 66 | 100 | 21 | 42 | 22 | 33 | 66 | 50 | 66 | 83 |
| | 22=>19 | 0 | 0 | 0 | 14 | 0 | 14 | 0 | 7 | 0 | 7 | 28 | 7 | 14 | 0 | 0 | 0 | 14 | 7 | 42 | 7 | 21 | 0 | 7 | 0 | 7 | 0 | 0 | 0 | 0 | 0 | 0 | 7 | 21 | 0 | 0 | 7 | 101 | 101 | 100 | 78 | 101 | 101 | 85 | 66 | 64 | 85 |
| | 23=>21 | 7 | 0 | 0 | 0 | 0 | 0 | 0 | 0 | 0 | 0 | 7 | 7 | 7 | 7 | 0 | 0 | 7 | 0 | 7 | 7 | 0 | 0 | 7 | 7 | 7 | 15 | 0 | 0 | 0 | 0 | 0 | 0 | 15 | 7 | 0 | 0 | 53 | 100 | 30 | 101 | 92 | 69 | 101 | 101 | 101 | 101 |

*Fig. 8C*

METHOD AND SYSTEM FOR CLASSIFICATION OF UNSTRUCTURED DATA ITEMS

FIELD OF THE INVENTION

The present disclosure relates to the processing of unstructured data, and more particularly, to method and system for the classification of unstructured data items.

DESCRIPTION OF THE RELATED ART

An ever-increasing reliance on information and computing systems that produce, process, distribute, and maintain such information in its various forms, continues to put great demands on techniques for providing data storage, access to that data storage, and management of the data thus stored. Business organizations, government organizations, and other organizations, and even individuals, can produce (and so, need to retain) large amounts of data. While data growth is not new, the pace of data growth has become more rapid, the location of data more dispersed, and linkages between data sets more complex, with each passing day.

As will be appreciated, then, this leaves today's organizations and individuals facing something of a crisis. Many organizations and individuals have been assiduously and comprehensively storing data for years. The problem is, these organizations and individuals are ill-equipped to manage such massive collections of data. In this regard, nowhere is today's rapid growth in data felt more keenly than in the exponential growth of unstructured data.

Unstructured data is a group of data items that is irregular in some way, such that the data items are not described by a pre-defined data model. As such, unstructured data does not reside in a traditional row-column database, spreadsheet, or comparable form, which results in irregularities that make unstructured data difficult to manage. By contrast, structured data is maintained in a strictly regular arrangement of data (e.g., that adheres to a pre-defined data model of some sort). Thus, a fundamental difference between structured and unstructured data is that structured data is organized in a highly regular, mechanical, and manageable manner, while unstructured data is not. Further, while unstructured data can include structured data (e.g., a database or spreadsheet among a number of other files in a filesystem directory), unstructured data will include at least some data that is irregular in some way. Even data that is structured in one or more certain aspects is still characterized as unstructured, particularly if the data's structure is not useful for the processing task at hand.

Compounding such challenges is the fact that unstructured data typically grows in both extent and complexity. It is estimated that somewhere around 80-90% of potentially usable business information exists unstructured form, and that unstructured data makes up 70%-80% of all data in organizations. Even if such unstructured data is not voluminous to begin with, the larger the unstructured data becomes, the worse the problem of managing such unstructured data becomes. In this regard, for such large sets of unstructured data, the management of configure settings on individual data items is typically quite challenging. This is true even where there is only a limited set of configuration patterns to be followed. Complicating matters is the fact that, even if the unstructured data is organized in some fashion (e.g., a directory structure), any such organization will inevitably change over time, and often, will do so quickly.

It is therefore desirable to provide a mechanism by which unstructured data items can be classified in an effective and efficient manner.

SUMMARY OF THE INVENTION

The present disclosure describes methods, computer program products, computer systems, and the like are disclosed that provide for the classification of unstructured data items. Such methods, computer program products, and computer systems include ingesting an item into a classification engine, performing term processing on one or more terms of the item, and processing a relational similarity index. The classification engine is implemented in the computer system. The relational similarity index represents a similarity of the item to a reference item, and the relational similarity index is determined using the one or more terms.

In certain embodiments, such methods, computer program products, computer systems, and the like can include identifying at least one term by determining a term frequency of each of the one or more terms in the item, performing noise filtering on the at least one term, and determining an inverse document frequency of the at least one term. The inverse document frequency is determined with respect to a corpus of items.

In certain other embodiments, such methods, computer program products, computer systems, and the like can include identifying an item pair in a pair list and generating a plurality of relational similarity indexes for a plurality of item pairs. Certain other embodiments can include determining whether an item pair list is empty, in response to the item pair list being empty, determining whether another item has been ingested, and in response to another item having been ingested, retrieving one or more terms of the another item.

In certain other embodiments, such methods, computer program products, computer systems, and the like can include enumerating a global item pair list and retrieving one or more terms of each item in the global item pair list. Certain other embodiments can include identifying one or more common terms and generating a similarity index using the one or more common terms. The one or more common terms are common as between the ingested item and the reference item. The ingested item and the reference item form a current pair.

In certain other embodiments, such methods, computer program products, computer systems, and the like can include determining whether the similarity index indicates that the current pair should be inserted in a global pair list and in response to a determination that the similarity index indicates that the current pair should be inserted in the global pair list, inserting the current pair in the global pair list. Certain other embodiments can include determining whether the similarity index indicates that the current pair should be inserted in a pair list of the item and in response to a determination that the similarity index indicates that the current pair should be inserted in the pair list of the item, inserting the current pair in the pair list of the item.

In certain other embodiments, such methods, computer program products, computer systems, and the like can include determining a maximum number of terms to include from a pair list of the item, identifying one or more common terms in the pair list of the item, and storing the number in a relational similarity index. A number of the one or more existing terms in the pair list of the item is less than the maximum number.

In certain other embodiments, such methods, computer program products, computer systems, and the like can include grouping a plurality of items into one or more groups of items, using classification information generated by the classification engine. The plurality of items comprises the item.

In certain other embodiments, such methods, computer program products, computer systems, and the like can include performing an operation on the one or more groups of items. The operation is one or more of a backup operation, a compliance policy operation, or a maintenance operation.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the systems described herein and equivalents thereof, as defined solely by the claims, will become apparent in view of the examples described in the detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

FIG. 6 is a simplified block diagram illustrating an example of an item pair list for a given item, according to embodiments of methods and systems such as those disclosed herein.

FIG. 7 is a simplified block diagram illustrating an example of a global item pair list, according to embodiments of methods and systems such as those disclosed herein.

FIG. 8A is a simplified diagram illustrating an example of a similarity matrix, according to embodiments of methods and systems such as those disclosed herein.

FIG. 8B is a simplified diagram illustrating an example of a similarity matrix, according to embodiments of methods and systems such as those disclosed herein.

FIG. 8C is a simplified diagram illustrating an example of a similarity matrix, according to embodiments of methods and systems such as those disclosed herein.

Figure 1:
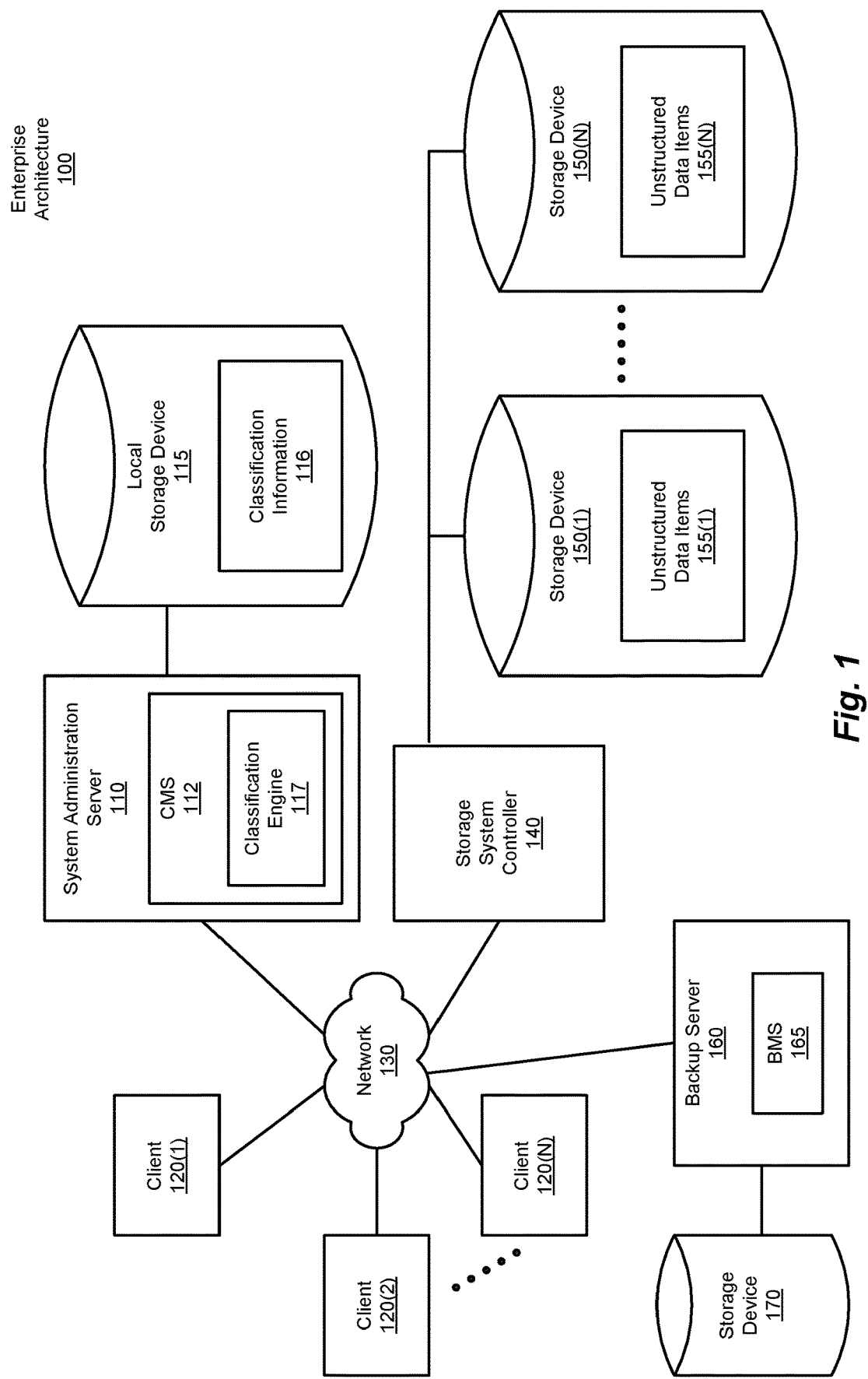
FIG. 1 is a simplified block diagram illustrating an example of an enterprise architecture, according to embodiments of methods and systems such as those disclosed herein.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover all modifications, equivalents and alternatives falling within the spirit and scope of methods and systems such as those described herein, as defined by the appended claims.

DETAILED DESCRIPTION

Introduction

Broadly, the concepts described herein are applicable to the classification of unstructured data items. Methods and systems such as those disclosed herein provide a flexible, efficient, and effective techniques for the classification of unstructured data items (including artifacts such as documents, presentations, spreadsheets, and the like). Such an approach facilitates the management of such unstructured data items, particularly in situations in which such unstructured data becomes increasing voluminous and its organization becomes increasingly complex and unwieldy.

As will be appreciated, even collections of items (e.g., data files in filesystems) that are structured in some regular fashion will tend to drift from their original states, particularly so in light of such collections' maintenance and use by individuals, organizations, groups, or other entities (which are prone to create, modify, and delete portions of such structures, often in capricious and unexpected ways). Compounding the problems such changes cause is the often unstructured nature of the data stored therein, which can be of nearly any type, format, size, and so on. When frequent changes are made to unstructured data, the complexity of the problem of managing such information becomes increasingly problematic, and finding desired information therein turns into the proverbial finding a needle in a haystack.

Unfortunately, existing document classification approaches include regular expression/pattern matching and probabilistic machine learning come with their own set of problems. Regular expression/pattern matching requires knowing patterns of interests beforehand, and requires every document to be independently and individually considered against multiple patterns/rules. Probabilistic machine learning (e.g. cosine similarity, Locality-Sensitive Hashing (LSH), Locality Preserving Hashing (LPH), and the like) requires significant resources, as well as lengthy/complex training phases, typically works only on formulated search query and/or on specifically identified pair of documents, and suffers from other such limitations. Thus, existing methodologies are forced to make a choice between requiring the use of a large pool of resources (including processing resources, memory resources, network bandwidth, and the like), or reduce sample size in an effort to constrain resource usage (and in so doing, reduce accuracy).

As will be appreciated in light of the present disclosure, classification can be seen, generically, as a method of identifying similarities among items such as documents (where one document is used as an identified reference) and distinguishing differences across established similarities (distinct correlations among documents). An efficient (low resource consuming) approach that can provide index of correlation between items and can also characterize such correlations would be valuable in the management and processing of large aggregations of items (referred to herein as a corpus) such as document repositories, in supporting functions such as compliance and analytics use cases. Further, any such approach should account for the continuous inflow (and expiry) of documents in the given repository, rather than using a static pool of items (e.g., documents and/or other artifacts). Further still, such an approach should eliminate (or at least minimize) any training required, while allowing human interpretation and adjustments as/if required. In so doing, such approaches provide for the determination as to the relevance of one item to another, a measure of such relevance, and the relevance of a third item with respect to the first two.

Embodiments of methods and systems such as those disclosed herein address such needs by employing term weighting techniques to generate histogram-like relational similarity matrices that can be used to effectively and efficiently group items, based on terms used therein and/or associated therewith. Thus, methods and systems such as those described herein employ concepts related to the distribution of information (e.g., textual information such as one or more terms (though graphical, image, metadata, and other such tokens contained in a given set of items can be used in this regard)) in the creation of representations that, once refined and normalized in form, can be used for the comparison of and determination as to similarity of two (or more) items. As noted elsewhere herein, methods and systems such as those described herein are able to adapt to dynamic conditions (as to changing documents in a document repository or other corpus), as such approaches are agnostic to the particular contents of and changes to items in the corpus itself. Further, not only can methods and systems such as those described herein maintain effective and efficient operation in spite of constantly-changing, large repositories, such techniques also scale the classification services such techniques provide (meaning that, as such repositories increase in size, performance is not degraded).

To accomplish such ends, methods and systems such as those described herein acquire term frequencies of an item (e.g., as by term vectors) and maintain an inverse document frequency of such terms. Individual terms are arranged in a descending order of ranking values for the given item, after the exclusion of noise terms. For given pairs of items, common terms as between items are determined, and the ranking values of a given number of the highest ranking value entries in such a list are summed. This sum is used as a similarity index as between the pair of items. A list of such ranking values and their item pairs is maintained, and if a given item pair within the existing pairs of highest ranking values (of some number of such pairs), the item pair in question can be inserted therein, if that item pair's ranking value is sufficient. Subsequently, if the number of item pairs in the list exceeds (or meets) a given threshold, the ingested (incoming) item is compared with one or more of the item pairs in the list. If the ingested document is found to be relevant by way of this process, the item is marked as being relevant to the given item pair. Once the foregoing has completed, a set of item pairs is found in which the ingested item is common among relevant similar item pairs. These item pairs are compared, and if the item in question is similar to multiple items with the same or different relationships, such information is recorded as reflecting a relational similarity index. Such a relational similarity index allows the creation of groups of correlated items.

In functioning in the manner noted with regard to the examples provided herein, methods and systems such as those described fines similarity across items, and also allows for the identification of similarities within one-to-many relations between items. Through the use of, for example, term weighting, such embodiments provide a simple, efficient, and effective solution to problems encountered in the field. As noted, such techniques are, desirably, capable of maintaining such performance even in circumstances in which large repositories of non-static items are to be classified (unlike existing technologies which implicate constraints such as the need to update patterns/rules and/or constantly require (re-)learning). These and other advantages will also become apparent in view of the following description and associated figures.

Example Enterprise Architecture

FIG. 1 is a simplified block diagram illustrating an example of an enterprise architecture, according to embodiments of methods and systems such as those disclosed herein. To that end, FIG. 1 depicts an enterprise architecture 100 that includes a system administration server 110 (supporting a classification management system (CMS) 112), which is coupled to a local storage device 115, in which classification information 116 is stored (e.g., indexes used by a classification engine 117 (also referred to herein as an information classification engine) within CMS 112). Coupled to system administration server 110 are a number of clients (depicted in FIG. 1 as clients 120(1)-(N)), via a network 130. Clients 120(1)-(N) are also coupled, via network 130, to a storage system controller 140. Storage system controller 140 provides clients 120(1)-(N) with access to networked data storage, for example, by way of providing access to a number of storage devices (depicted in FIG. 1 as storages devices 150(1)-(N)). As can be seen in FIG. 1, data stored by storage system controller 140 on storage devices 150(1)-(N) (referred to in the aggregate as storage devices 150) on behalf of clients 120(1)-(N) can be, for example, unstructured data items (depicted in FIG. 1 as unstructured data items 155(1)-(N), referred to in the aggregate as unstructured data items (UDI) 155).

As noted earlier, unstructured data items such as unstructured data items 155 can include all manner of file types, formats, file-based device support, links, and other such storage entities, which can (and typically do) constantly change. In such environments, the unstructured data items stored throughout the various structures stored in storage devices 150 (unstructured data items 155) need to be managed with regard to user permissions, retention policies, backup schedules, and other such configuration management functions. To this end, as an example, a backup server 160 is coupled to network 130, and includes a backup management system (BMS) 165. Backup server 160 is also coupled to one or more storage devices (depicted in FIG. 1 as a storage device 170). In order to protect the data of users stored by storage system controller 140 on storage devices 150(1)-(N), backup management system 165 backs-up such data to storage device 170.

As noted elsewhere herein, and as will be apparent from FIG. 1, as the various structures and amount of UDI 155, as an example, becomes greater in both complexity and extent, the task of indicating to backup management system 165 which of UDI 155 should be, for example, backed up and when such backups should occur also increases in its complexity and extent. Thus, a system administrator can look to a classification management system such as classification management system 112 to facilitate the classification of the items of UDI 155 and so the manner in which such items should be processed (e.g., which items should be backed up, which items are subject to determinations as to compliance, and so on). To accomplish this, classification engine 117 of classification management system 112 employs classification information 116 to perform classification operations on items in UDI 155, as described in connection with FIGS. 2-5B, subsequently.

Classification engine 117 operates using classification information 116 (e.g., indexes, rules, and the like, used by classification engine 117 (also referred to herein as an information classification engine) such as item pair lists, similarity indexes, relational similarity indexes, tables, and other such information, usable by classification engine 117 in processing one or more items (e.g., such as a document, spreadsheet, presentation, or other such artifact, or other such unstructured data (or even structured data such as database or information retrieved therefrom, in certain embodiments)). Classification engine 117 can, for example, automatically classify items based on their content and metadata, as well as their relationships to existing items and to one another. In applications that provide insights into information ingested by such systems, as well as existing items already stored in the system's storage devices (e.g., storage devices 150). Such items can be searched and filtered, for example, according to the tags associated therewith, as assigned by classification engine 117.

For example, classification engine 117 can process items for further processing in light of compliance policies and usage patterns, and update tags and other metadata, in order to give structure to otherwise unstructured data. Classification engine 117 evaluates the items ingested for classification, which classification can then be used to process such items based on a set of policies. Each such policy can also specify the conditions that a group of items must meet to be assigned a specific classification tag. Such policies cover regulations and corporate standards for which such items may be classified. Further, when a group of items that have been classified meets the conditions of a policy, associated tags can be assigned to the group of items. Such tags can be standard tags, or can be custom tags, added to those provided as standard tags. Each such tag can be associated with an index property for the item group. An index property is a metadata property of an item group in which a tag is to be stored. Such a tag can also be associated with a retention category. In so doing, such retention categories can be assigned to item groups contemporaneously with assignment of the tag to the item group.

Processing by classification engine 117 (or module(s) with comparable functionality) begins with the ingestion of an item, for example, via an agent (e.g., a file system archiving task, a protocol-based task, or the like, which can be implemented, for example, as a daemon), which can then be passed to a storage service to perform content conversion. At this point, if the destination archive is enabled for classification with a retention plan, for example, the converted index version of the original item is passed to a classification process, which, in turn, passes the item to classification engine 117 engine. Classification rules are applied to the item, and any tags (custom, discard, include or exclude from supervisory review, backup tags, compliance tags, and so on) are returned, before the item is stored. At this juncture, if a classification tag matches a retention category, the retention category of the item can be updated (if allowed by policy). Disposition of items can be guided by considerations such as proximity searching, keyword searching. checksum validation, the use of regular expressions, confidence-based rules, number of items, and other such factors. Compliance of an item group can be determined with respect to internal policies, rules of governmental agencies, state and/or federal laws, and/or other such guidelines.

Information regarding data such as unstructured data can be exceptionally rich. Such information can include file metadata, user activity, content classification, effective permissions, and other such information. File metadata can include information such as size, size on disk, modified date, access date, creation date, user identity, and other such information. Effective permissions can include access control lists, sharing information, group structures, and other such information. Content classification can include characteristics such as personally-identifiable information, user credentials, confidential information, credit card information, and other such information. Items can be classified using such information.

Example Processes for Classifying Unstructured Data

Figure 2:
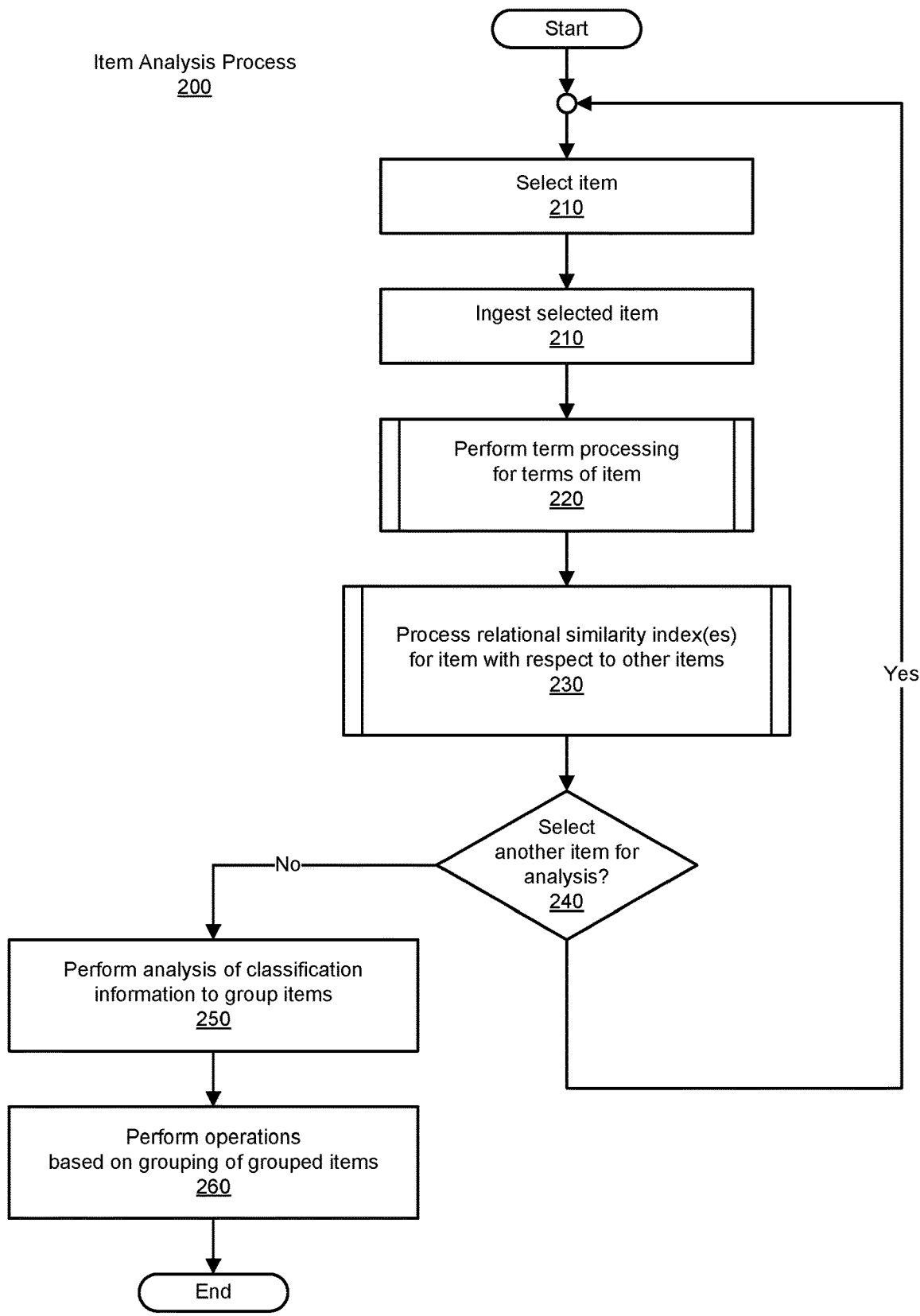
FIG. 2 is a flow diagram illustrating an example of an item analysis process, according to embodiments of methods and systems such as those disclosed herein.

FIG. 2 is a flow diagram illustrating an example of an item analysis process, according to embodiments of methods and systems such as those disclosed herein. That being the case, the flow diagram of FIG. 2 depicts an item analysis process 200. Item analysis process 200 begins with the selection of an item to be processed (210). Next, the selected item (e.g., an item stored in one of storage devices 150) is ingested for processing by, for example, a classification engine such as classification engine 117, and is processed as per rules, constraints, parameters, and the like, as may be stored in classification information 116.

Once the selected item has been ingested, term processing is performed to identify one or more terms of the item (220). An example of the operations that can be performed in such term processing are described in greater detail in connection with the description of FIG. 3, subsequently. Terms of interest of the selected item can then be processed in order to determine the item's similarity to other items being analyzed (230). Such processing results in the generation and storage of relational similarity information for the given item, with respect to other items.

Once the selected item has been processed in the manner noted, another item can be selected for analysis (240). If another item is to be analyzed, item analysis process 200 loops back to the selection of that item (250). Alternatively, if no further items remain for analysis, item analysis process 200 proceeds to the performing of one or more analyses that facilitate and support the grouping of items based on their classification and information generated during their classification (e.g., metadata such as classification tags). Once the items in question have been classified and grouped, operations based on such grouping can be performed (260). Such operations can take a number of forms, including, but not limited to, backup operations, archival operations, compliance operations, search operations, and the like. At this juncture, item analysis process 200 concludes.

Figure 3:
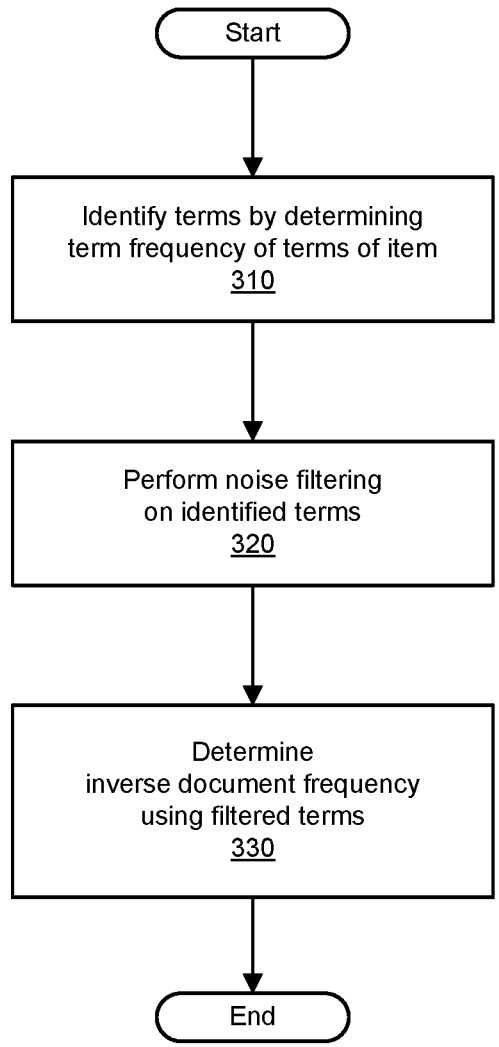
FIG. 3 is a flow diagram illustrating an example of a process for processing one or more terms, according to embodiments of methods and systems such as those disclosed herein.

FIG. 3 is a flow diagram illustrating an example of a process for the processing of one or more terms, according to embodiments of methods and systems such as those disclosed herein. One example of such an analysis process is a term frequency—inverse document frequency analysis. Thus, for example, a term analysis process that identifies terms of interest in an item can use a combination of the frequency of use of the term in the item, and the frequency of use of the term in items of a corpus, and can be referred to as a term-weighting schemes. One such approach is a term frequency—inverse document frequency analysis, which provides a numerical statistic that reflects the importance of a term to an item (e.g., the importance of a word to a document a document in a collection or corpus). Such measures can be used as a weighting factor in searches of information retrieval, text mining, item classification, and the like. The value determined increases proportionally to the number of times a term appears in the item in question, and is offset by the number of items in the corpus that contain the term, which helps to adjust for the fact that some words appear more frequently in general. Such approaches can be used as part of a scoring and ranking of a term's relevance to an item, specifically, and/or to a corpus, globally. Further, such approaches can be used in the classification of items to good effect.

As used herein, term frequency represents the frequency with which a given term appears in a given item. As will be appreciated in light of the present disclosure, differences between items (e.g., textual documents of different length, different types of items (textual document versus presentation/spreadsheet), and so on) may need to be accounted for, and so the use of correction factors in certain embodiments is intended to be comprehended by the present disclosure. Determinations as to term frequency therefore can be described as the weight of a term that occurs in an item, where the more often a term occurs, the greater its weight. Term frequency can represent determinations such as simply the number of occurrences of a term in a given item, the Boolean frequency thereof, a logarithmically scaled frequency, or the like, and can be adjusted to account for variations such as document length and the like.

Also as used herein, inverse document frequency can be taken to be a factor that diminishes the weight of terms that occur very frequently in the document set and increases the weight of terms that occur rarely. Thus, in a statistical sense, the importance of a term can, in certain circumstances, be related to the inverse of a number of items in which the term occurs. Thus, the inverse document frequency represents the importance of the term (or the amount of information the term conveys). In certain embodiments, such an inverse document frequency can be determined as the logarithmically scaled value of the total number of items divided by the number of items containing the term of interest. In so doing, the importance of common terms (or at least, common within the corpus of interest) can be reduced.

In view of the foregoing, the flow diagram of FIG. 3 depicts a term processing process 300. Term processing process 300 begins with the identification of terms, which is accomplished by determining the term frequency of each of the terms of the item (310). Next, noise filtering is performed on the terms thus identified (320). Such noise filtering can be used to further reduce the impact of common (and so, less important) terms, as such terms appear in the corpus of interest. As will be appreciated in light of the present disclosure, analyses such as those described herein (being concerned with the analysis of unstructured data) are often faced with situations in which meaningful terms are intermingled with what is referred to herein as noise terms (e.g., with regard to textual terms, words such as "the," "of," "a," and so on). As will also be appreciated, it is desirable to eliminate such terms, in order to improve the accuracy and reliability of such analyses. That being the case, filtering out such noise terms, which can also include spelling errors, abbreviations, non-standard words, repetitions, punctuation, and the like, can be accomplished using semantic analysis, stop-word analysis, tagging, parsing, and other such techniques.

Once noise filtering has been performed on the identified terms (and thus, low-value terms have been removed from the pool of candidate terms), a determination is made with respect to the other items in the corpus of interest (330). In light of the noise filtering performed prior to this inverse document frequency analysis, the efficiency and effectiveness of the inverse document frequency analysis performed on the terms of the ingested item is significantly improved. Term processing process 300 then concludes.

Figure 4:
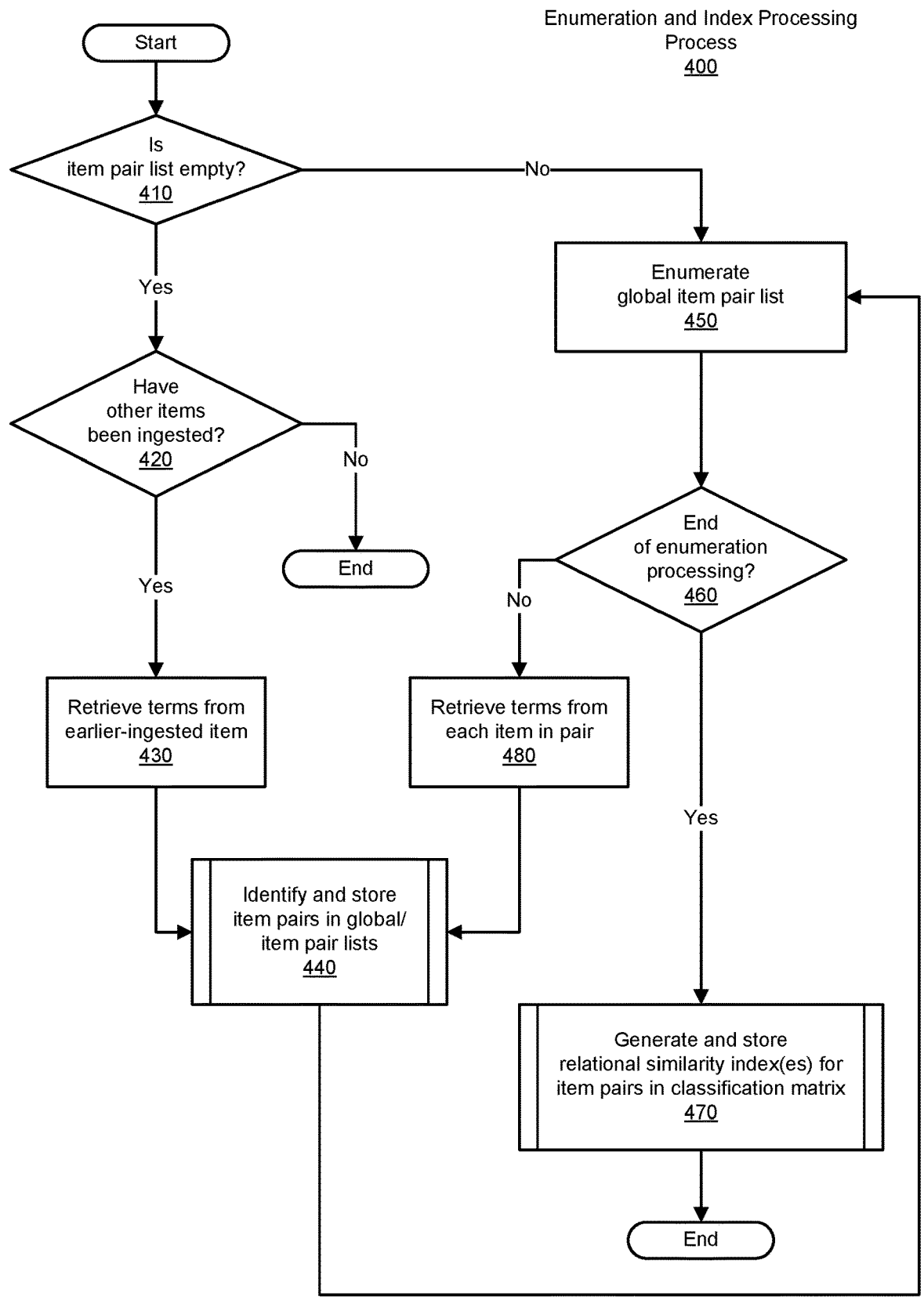
FIG. 4 is a flow diagram illustrating an example of a process for enumeration and index processing, according to embodiments of methods and systems such as those disclosed herein.

FIG. 4 is a flow diagram illustrating an example of a process for enumeration and index processing, according to embodiments of methods and systems such as those disclosed herein. That being the case, the flow diagram of FIG. 4 depicts in enumeration and index processing process 400. Enumeration and index processing process 400 begins with a determination as to whether the item hair list in question is empty (410). If the item pair list is empty, a determination is made as to whether other items have been ingested parentheses (420). If the item pair list is empty and no other items been ingested, enumeration and index processing process 400 includes.

Alternatively, if other items have been ingested, enumeration and index processing process 400 proceeds to the retrieval of terms from one or more earlier-ingested items (430). Once the requisite terms have been retrieved, a process of identifying and storing item pairs in global/item pair lists is performed (440). An example of the operations that can be performed in such identification and storage are described in greater detail in connection with the description of FIG. 5A, subsequently.

Once the requisite item pairs have been identified and stored in the appropriate global/item pair lists, enumeration and index processing process 400 proceeds to the enumeration of the global item pair list (450). A determination is then made as to whether enumeration and index processing process 400 has completed (460). In the case in which enumeration and index processing process 400 is complete, one or more relational similarity indexes for the given item pairs are generated and stored in a classification matrix (470). At this point, enumeration and index processing process 400 concludes.

Alternatively, in the case in which enumeration and index processing process 400 is to continue to analyze terms for each item in the item pair, such terms are retrieved (480). Enumeration and index processing process 400 then proceeds to the identification and storage of item pairs in global/item pair lists (440). As before, the global item pair list is enumerated (450). Also as before, a determination is made as to whether enumeration and index processing process 400 has completed (460). At this juncture, terms from each item in the given item pair can be retrieved and processed (480 and 440), and enumeration and index processing process 400 can continue to iterate. Alternatively, and as before, if enumeration and index processing process 400 is complete, enumeration and index processing process 400 can proceed to the generation and storage of one or more relational similarity indexes for the given item pairs, in the appropriate classification matrix (470). Enumeration and index processing process 400 then concludes.

Figure 5A:
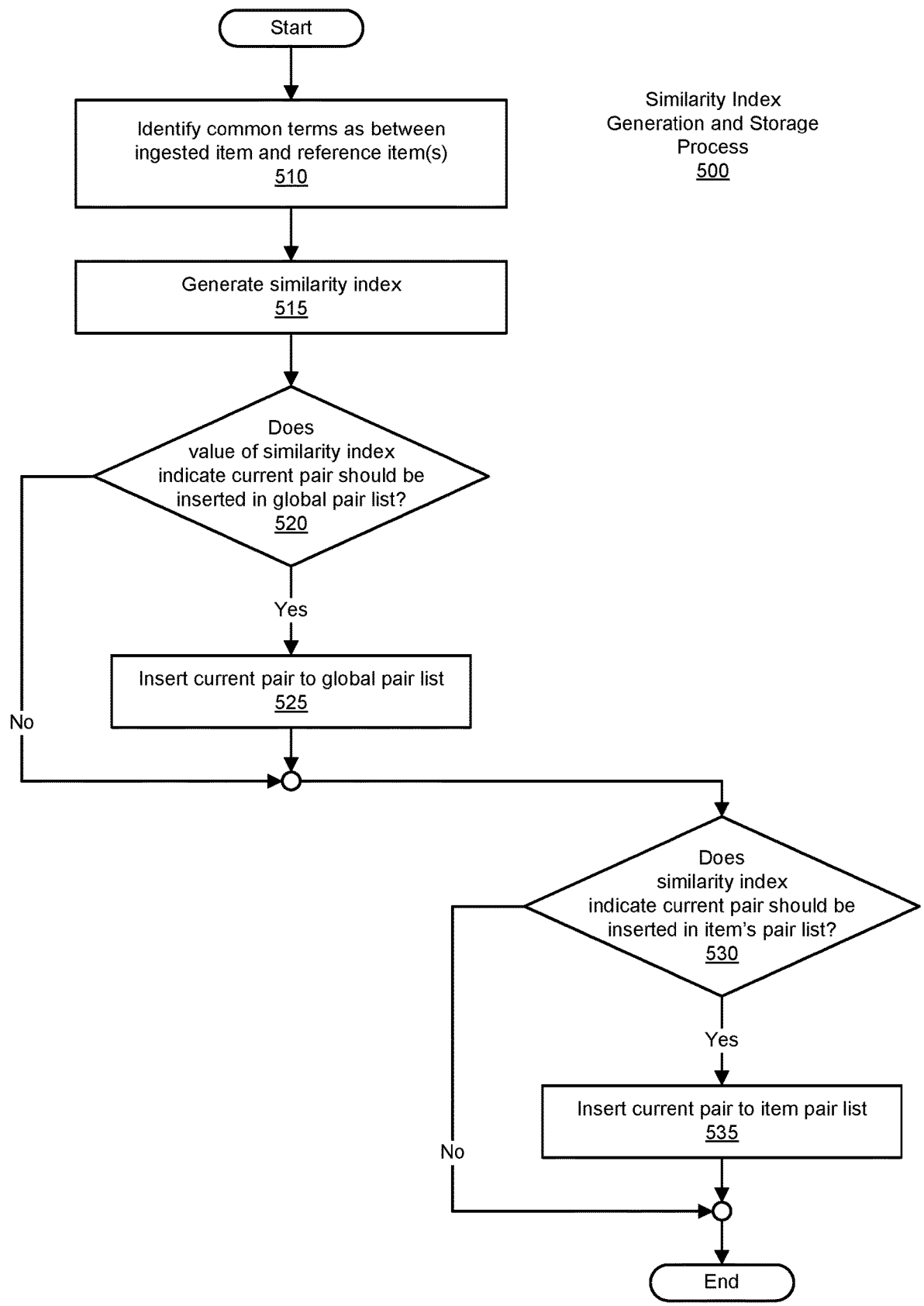
FIG. 5A is a flow diagram illustrating an example of a process for similarity index generation and storage, according to embodiments of methods and systems such as those disclosed herein.

FIG. 5A is a flow diagram illustrating an example of a process for similarity index generation and storage, according to embodiments of methods and systems such as those disclosed herein. That being the case, the flow diagram of FIG. 5A depicts a similarity index generation and storage process 500. Similarity index generation and storage process 500 begins with the identification of common terms as between the ingested item and reference document(s) (510).

A similarity index, as between the ingested item and reference document, is then generated (515). Such a similarity index can be generated, for example, by summing some number of the highest ranking values for those terms that are common as between the items in the item pair. Further, to such indexes can be used in the case in which reference is with regard to a global pair.

Next, a determination is made as to whether the value of the similarity index generated indicates that the current item pair should be inserted into a global pair list (520). If the foregoing determination indicates that the current item pair should be inserted in the global pair list, similarity index generation and storage process 500 inserts the current item pair into the global pair list (525). Alternatively, if the similarity index's value is insufficient, the current item pair is not inserted in the global pair list (which can be accomplished by skipping 525).

In comparable fashion, a determination is then made as to whether the similarity index generated indicates that the current item pair should be inserted into the item's pair list (530). If the foregoing determination indicates that the current item pair should be inserted in the item's pair list, similarity index generation and storage process 500 inserts the current item pair into the item's pair list (535). In the alternative, and as before, if the similarity index's value is insufficient, the current item pair is not inserted in the item's pair list (which can be accomplished by skipping 535). Similarity index generation and storage process 500 then concludes.

Figure 5B:
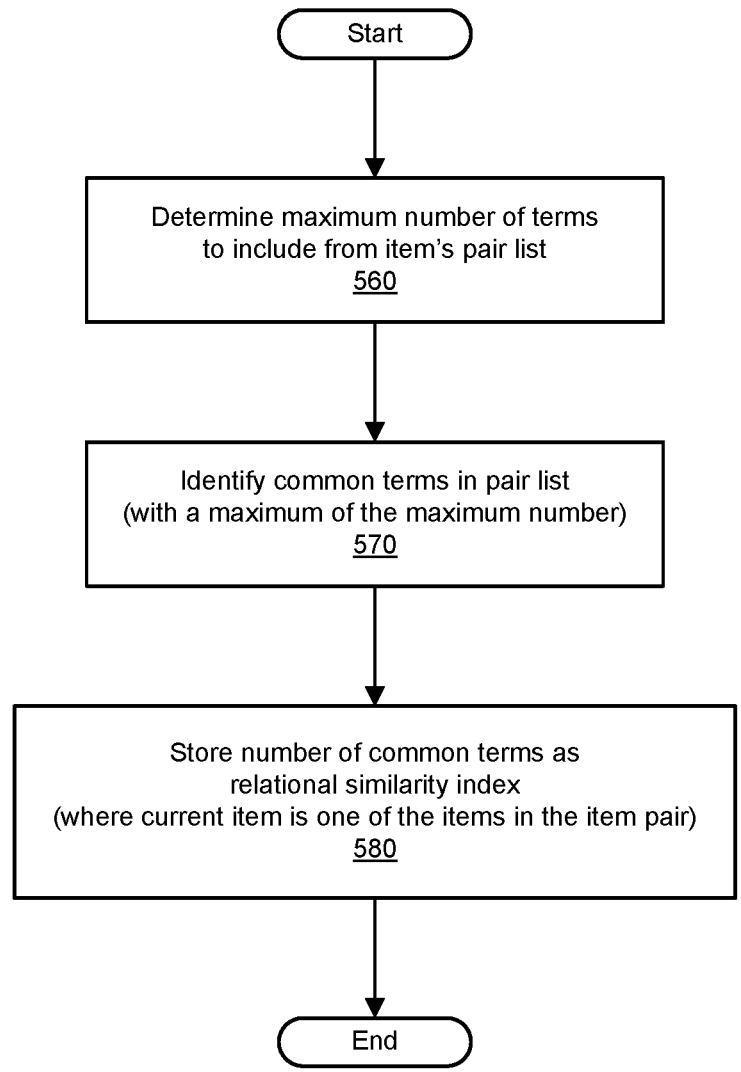
FIG. 5B is a flow diagram illustrating an example of a process for the determination of one or more relational similarity indexes, according to embodiments of methods and systems such as those disclosed herein.

FIG. 5B is a flow diagram illustrating an example of a process for the determination of one or more relational similarity indexes, according to embodiments of methods and systems such as those disclosed herein. That being the case, the flow diagram of FIG. 5B depicts a relational similarity index generation and storage process 550. Relational similarity index generation and storage process 550 begins with a determination as to the maximum number of terms (from the item's pair list) to be considered in generating the desired relational similarity index (560). The maximum number of terms to be considered having been determined, common terms in the given pair list are identified (570). The number of common terms thus determined, such number is then stored as the desired relational similarity index (580). As will be appreciated in light of the present disclosure, such current item is one of the items in the item pair being analyzed.

FIG. 6 is a simplified block diagram illustrating an example of an item pair list for a given item, according to embodiments of methods and systems such as those disclosed herein. That being the case, FIG. 6 depicts an item pair list 600. Item pair list 600 is a list of item pairs for a given item, such as that referenced in connection with enumeration and index processing process 400 (as well in greater detail with respect to similarity index generation and storage process 500), and includes some number of entries that each include pair information (depicted in FIG. 6 as pair information 610(1)-(N), or in the aggregate as pair information 610), which indicates the pair of items involved, and a ranking value (depicted in FIG. 6 as ranking values 620(1)-(N), or in the aggregate as ranking values 620).

As noted, for given pairs of items, common terms as between items are determined, and the ranking values of a given number of the highest ranking value entries in such a list are summed. This sum is used as a similarity index as between the pair of items. A list of such ranking values and their item pairs is maintained, and if a given item pair within the existing pairs of highest ranking values (of some number of such pairs), the item pair in question can be inserted therein, if that item pair's ranking value is sufficient. Subsequently, if the number of item pairs in the list exceeds (or meets) a given threshold, the ingested (incoming) item is compared with one or more of the item pairs in the list. With regard to pair information 610, it will be appreciated that such information can include item identifiers for each of the items in the item pair (e.g., document titles). However, a more efficient approach here is to hash some/all information associated with each item (e.g., as by hashing each item's title, contents, metadata, or other such information), in order to save storage space, and standardize the size of pair information 610. As will be appreciated in light of the present disclosure, in fact, such information can be hashed again (e.g., a two-level hash), in order to save additional space and make the processing of such lists even more efficient, while maintaining the ability to uniquely identify the item pair (and so, the item pair's respective ranking value).

FIG. 7 is a simplified block diagram illustrating an example of a global item pair list, according to embodiments of methods and systems such as those disclosed herein. That being the case, FIG. 7 depicts a global pair list 700. Global pair list 700, such as that referenced in connection with enumeration and index processing process 400 (as well in greater detail with respect to relational similarity index generation and storage process 550), and includes some number of entries that each include global pair information (depicted in FIG. 7 as global pair information 710(1)-(N), or in the aggregate as global pair information 710), which indicates the items involved, and a global ranking value (depicted in FIG. 7 as global ranking values 720(1)-(N), or in the aggregate as global ranking values 720). As with item pair list 600, global pair information 710 can be hashed again (e.g., a two-level hash), in order to save additional space and make the processing of such lists even more efficient, while maintaining the ability to uniquely identify the item pair (and so, the item pair's respective ranking value).

FIG. 8A is a simplified diagram illustrating an example of a similarity matrix, according to embodiments of methods and systems such as those disclosed herein. In FIG. 6, a similarity matrix is depicted, in which ranking values for individual item pairs are presented (here, documents related to various subjects, identified in FIG. 6 as document categories). As can be seen, prominent item pairs are identified across rows. While identity is demonstrated along the major diagonal of the similarity matrix, the relevance of deemed-important terms in a given item are reflected to some extent in other items (by the relevant ranking value). As will be appreciated in light of the present disclosure, the diagram of FIG. 8A can be implemented, for example, as a heat map (a graphical representation of data in which the individual values contained in a matrix are represented as colors). This can be done, for example, in order to more clearly reflect the various rankings for purposes of human readability. As will also be appreciated, this is the case for the diagrams depicted in FIGS. 8B and 8C, as well.

FIG. 8B is a simplified diagram illustrating an example of a similarity matrix, according to embodiments of methods and systems such as those disclosed herein. In, FIG. 7, a similarity matrix is depicted, in which ranking values for similarity with prominent pairs (by multidimensional clustering) are presented (again, documents related to various subjects, identified in FIG. 7 as document categories). As can be seen, such multidimensional clustering is reflected by the winnowing-down of inter-item relevancy.

FIG. 8C is a simplified diagram illustrating an example of a similarity matrix, according to embodiments of methods and systems such as those disclosed herein. In, FIG. 8, a similarity matrix is depicted, in which ranking values for similarity across item pairs (relational similarity) is demonstrated (once again, documents related to various subjects, identified in FIG. 8 as document categories). As can be seen, the similarity diagram of FIG. 8 demonstrates the relational similarity between certain items thereof, as is reflected in the ranking values.

An Example Computing and Network Environment

As shown above, the systems described herein can be implemented using a variety of computer systems and networks. Examples of such computing and network environments are described below with reference to FIGS. 9 and 10.

Figure 9:
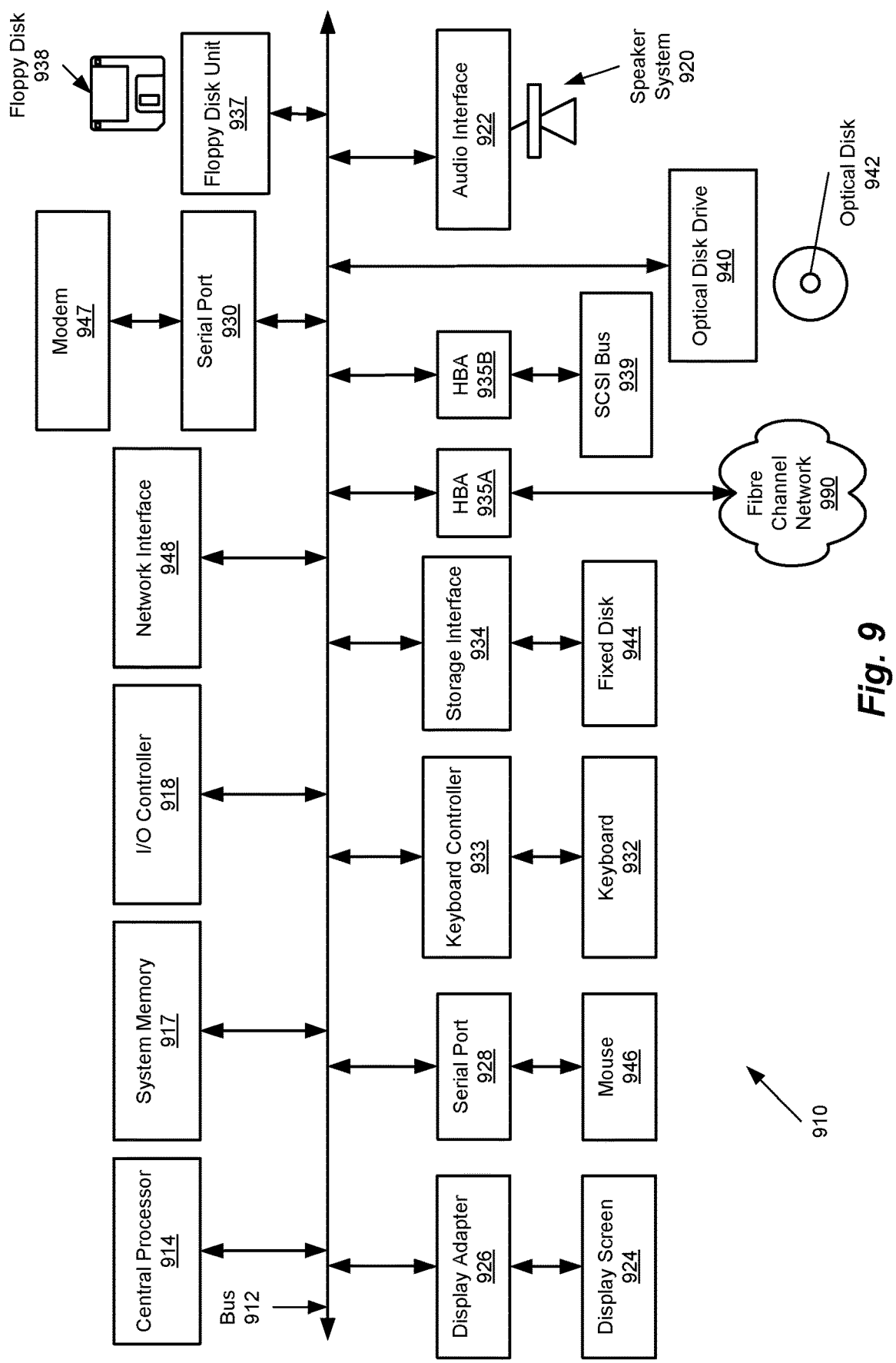
FIG. 9 is a block diagram depicting a computer system suitable for implementing embodiments of methods and systems such as those disclosed herein.

FIG. 9 depicts a block diagram of a computer system 910 suitable for implementing aspects of the systems described herein. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 910 are generally stored on and accessed from a computer-readable storage medium, such as a hard disk drive (e.g., fixed disk 944), an optical drive (e.g., optical drive 940), a floppy disk unit 937, or other computer-readable storage medium.

Storage interface 934, as with the other storage interfaces of computer system 910, can connect to a standard computer-readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the systems described herein. The devices and subsystems can be interconnected in different ways from that shown in FIG. 9. The operation of a computer system such as that shown in FIG. 9 is readily known in the art and is not discussed in detail in this application. Code to implement the modules of the systems described herein can be stored in computer-readable storage media such as one or more of system memory 917, fixed disk 944, optical disk 942, or floppy disk 938. The operating system provided on computer system 910 may be MS-DOS®, MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
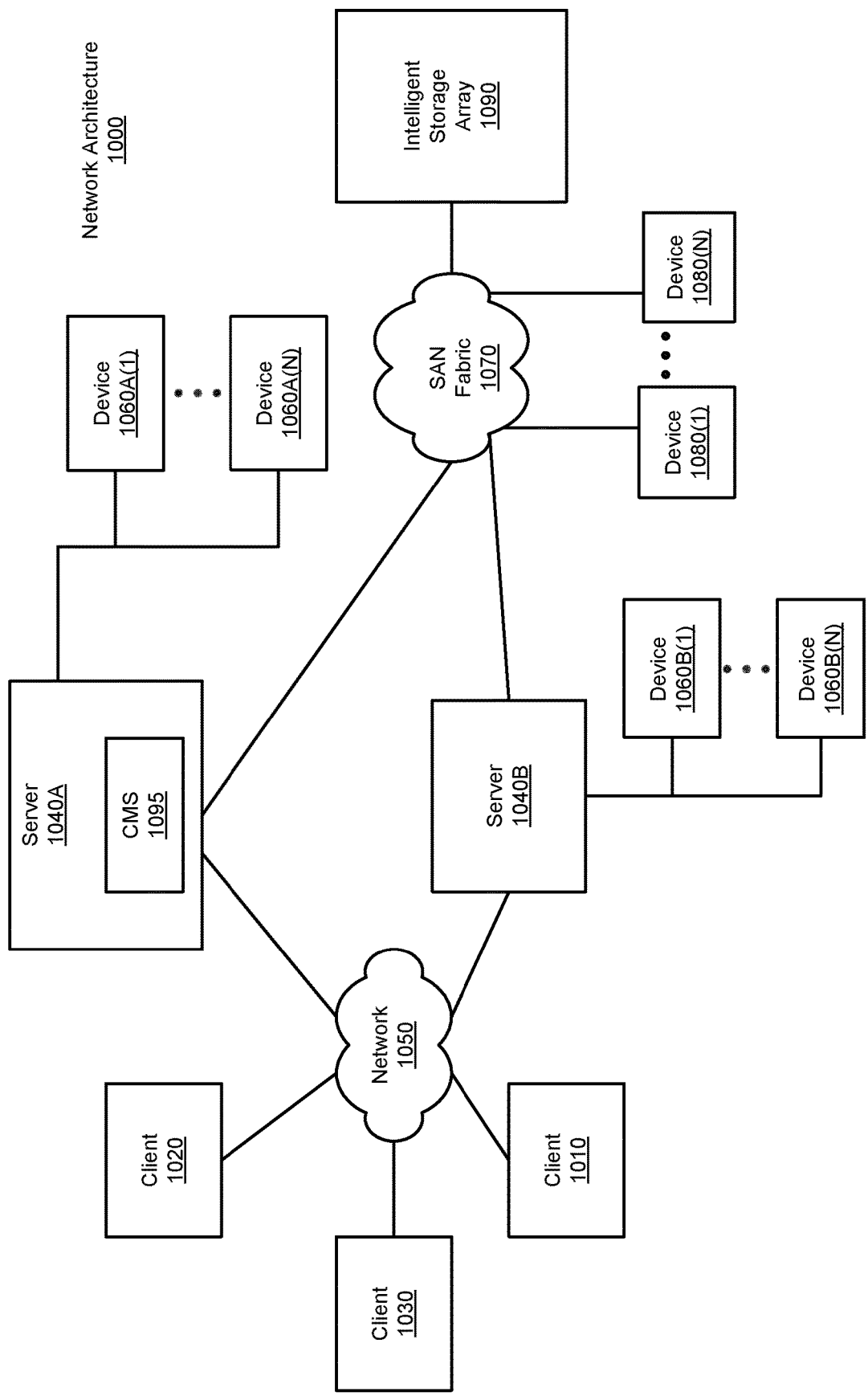
FIG. 10 is a block diagram depicting a network architecture suitable for implementing embodiments of methods and systems such as those disclosed herein.

FIG. 10 is a block diagram depicting a network architecture 1000 in which client systems 1010, 1020 and 1030, as well as storage servers 1040A and 1040B (any of which can be implemented using computer system 1010), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation. SAN fabric 1070 supports access to storage devices 1080(1)-(N) by storage servers 1040A and 1040B, and so by client systems 1010, 1020 and 1030 via network 1050. An intelligent storage array 1090 is also shown as an example of a specific storage device accessible via SAN fabric 1070.

Storage server 1040A is also depicted as supporting a configuration management system (CMS) 1095, which can implement methods and systems such as those described herein, and can, in so doing, provide classification management functionality that facilitates the classification of data (e.g., unstructured data) stored, for example, in one or more of storage devices 1060A(1)-(N), in the manner previously noted with regard to FIGS. 2-5B.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the systems described herein are not limited to the Internet or any particular network-based environment.

OTHER EMBODIMENTS

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A computer-implemented method, implemented in a computer system, comprising:
    producing an item identifier corresponding to each unstructured data item of a plurality of unstructured data items, wherein
        the producing comprises
            performing a hashing operation on information associated with each of the plurality of unstructured data items;
    storing each unstructured data item and its corresponding item identifier in association with one another in a storage device of the computer system;
    for each item of a plurality of items,
        determining whether a backup operation should be performed on an item of the plurality of items, wherein
            the item and each unstructured data item comprises unstructured data, and
            the determining comprises
                ingesting the item into a classification engine, wherein
                    the classification engine is implemented in the computer system, and
                    the ingesting comprises
                        generating an item identifier for the item, at least in part, by performing the hash operation on information associated with the item, and
                        storing the item identifier and item in association with one another in the storage device,
                performing term processing, wherein
                    the performing the term processing comprises
                        determining a first number of occurrences of each term of a plurality of terms in the item, comprising
                            identifying at least one term of the plurality of terms in the item by determining a term frequency of each of the plurality of terms in the item, and determining an inverse document frequency of the at least one term with respect to the plurality of unstructured data items, and determining a second number of occurrences of each term of the plurality of terms in a reference item of unstructured data, generating a similarity index, comprising producing a first list of ranking values by ranking the plurality of terms in the item based on the first number of occurrences, producing a second list of ranking values by ranking the plurality of terms in the reference item based on the second number of occurrences, and determining a number of common ranking values, wherein each ranking value is in the first list of ranking values and in the second list of ranking values, and responsive to a size of the similarity index meeting a threshold, determining a relational similarity index, wherein the relational similarity index is based, at least in part, on a subset of the first list of ranking values and another subset of a list of ranking values for an unstructured data item of the plurality of unstructured data items, and the relational similarity index represents a similarity between the item and the unstructured data item, and in response to the relational similarity index indicating that the item and the unstructured data item are sufficiently similar, associating a classification tag with the item; and performing a backup operation on one or more items of the plurality of items that are associated with the classification tag.

2. The method of claim 1, wherein the information associated with each unstructured data item comprises at least one of a data item title, data item contents, or data item metadata, the hash operation comprises a two-level hash operation the first list of ranking values and the second list of ranking values are stored in a classification matrix, and the term processing comprises performing noise filtering on the at least one term.

3. The method of claim 1, wherein the determining the relational similarity index comprises:

identifying an item pair in a pair list; and generating a plurality of relational similarity indexes for a plurality of item pairs.

4. The method of claim 3, wherein the determining the relational similarity index further comprises:

determining whether an item pair list is empty;

in response to determining that the item pair list is empty, determining whether another item has been ingested; and in response to determining that another item has been ingested, retrieving a plurality of terms of the another item.

5. The method of claim 3, wherein the determining the relational similarity index further comprises:

enumerating a global item pair list; and retrieving a plurality of terms of each item in the global item pair list.

6. The method of claim 3, wherein the identifying the item pair in the pair list comprises:

identifying a plurality of common terms, wherein the plurality of common terms are common as between the item and the reference item, and the item and the reference item form a current pair; and generating a similarity index using the plurality of common terms.

7. The method of claim 6, wherein the identifying the item pair in the pair list further comprises:

determining whether the similarity index indicates that the current pair should be inserted in a global pair list; and in response to a determination that the similarity index indicates that the current pair should be inserted in the global pair list, inserting the current pair in the global pair list.

8. The method of claim 6, wherein the identifying the item pair in the pair list further comprises:

determining whether the similarity index indicates that the current pair should be inserted in a pair list of the item; and in response to a determination that the similarity index indicates that the current pair should be inserted in the pair list of the item, inserting the current pair in the pair list of the item.

9. The method of claim 3, wherein the generating the plurality of relational similarity indexes comprises:

determining a maximum number of terms to include from a pair list of the item;

identifying a plurality of common terms in the pair list of the item, wherein a number of the plurality of common terms in the pair list of the item is less than the maximum number of terms; and storing the number in a relational similarity index.

10. The method of claim 2, further comprising:

generating a plurality of item identifiers, wherein the ranking values of the first list of ranking values and the ranking values of the second list of ranking values are stored in a data structure that associates one or more terms of the plurality of terms of the item with one or more terms of the plurality of terms in the reference item, and the generating comprises the performing the hash operation on each item of a plurality of items; and grouping a plurality of items into one or more groups of items, using classification information generated by the classification engine, wherein the plurality of items comprises the item.

11. A non-transitory computer-readable storage medium, comprising program instructions, which, when executed by one or more processors of a computing system, perform a method comprising:

producing an item identifier corresponding to each unstructured data item of a plurality of unstructured data items, wherein the producing comprises performing a hashing operation on information associated with each of the plurality of unstructured data items;

storing each unstructured data item and its corresponding item identifier in association with one another in a storage device of the computer system;

for each item of a plurality of items, determining whether a backup operation should be performed on an item of the plurality of items, wherein the item and each unstructured data item comprises
   unstructured data, and
the determining comprises
   ingesting the item into a classification engine,
      wherein
         the classification engine is implemented in the
            computer system, and the ingesting comprises
            generating an item identifier for the item, at
            least in part, by performing the hash operation
            on information associated with the item, and
            storing the item identifier and item in association
            with one another in the storage device,
   performing term processing, wherein
      the performing the term processing comprises
         determining a first number of occurrences of
            each term of a plurality of terms in the item,
            comprising
            identifying at least one term of the plurality of
               terms in the item by determining a term frequency
               of each of the plurality of terms in the
               item, and
            determining an inverse document frequency of
               the at least one term with respect to the plurality
               of unstructured data items, and
         determining a second number of occurrences of
            each term of the plurality of terms in a reference
            item, wherein the reference item comprises
            unstructured data,
      generating a similarity index, comprising
         producing a first list of ranking values by ranking
            the plurality of terms in the item based on the
            first number of occurrence,
         producing a second list of ranking values by
            ranking the plurality of terms in the reference
            item based on the second number of occurrences,
            and
         determining a number of common ranking values,
            wherein
            each ranking value is in the first list of ranking
               values and in the second list of ranking values,
               and
      responsive to a size of the similarity index meeting
         a threshold,
         determining a relational similarity index, wherein
            the relational similarity index is based, at least
               in part, on processing a subset of the first list of
               ranking values and processing another subset of
               a list of ranking values for an unstructured data
               item of the plurality of unstructured data items,
               and
            the relational similarity index represents a similarity
               between the item and the unstructured
               data item, and
            in response to the relational similarity index
               indicating that the item and the unstructured
               data item are sufficiently similar, associating a
               classification tag with the item; and
   performing a backup operation on one or more items of
      the plurality of items that are associated with the
      classification tag.
12. The non-transitory computer-readable storage medium of claim 11, wherein
   the information associated with each unstructured data item comprises at least one of
      a data item title,
      data item contents, or
      data item metadata,
   the hash operation comprises a two-level hash operation
   the first list of ranking values and the second list of
      ranking values are stored in a classification matrix, and
   the term processing comprises
      performing noise filtering on the at least one term.
13. The non-transitory computer-readable storage medium of claim 11, wherein the determining the relational similarity index comprises:
   identifying an item pair in a pair list; and
   generating a plurality of relational similarity indexes for a plurality of item pairs.
14. The non-transitory computer-readable storage medium of claim 13, wherein the determining the relational similarity index further comprises:
   determining whether an item pair list is empty;
   in response to determining that the item pair list is empty, determining whether another item has been ingested; and
   in response to determining that another item has been ingested, retrieving a plurality of terms of the another item.
15. The non-transitory computer-readable storage medium of claim 13, wherein the determining the relational similarity index further comprises:
   enumerating a global item pair list; and
   retrieving a plurality of terms of each item in the global item pair list.
16. The non-transitory computer-readable storage medium of claim 13, wherein the identifying the item pair in the pair list comprises:
   identifying a plurality of common terms, wherein
      the plurality of common terms are common as between the item and the reference item, and
      the item and the reference item form a current pair; and
   generating a similarity index using the plurality of common terms.
17. The non-transitory computer-readable storage medium of claim 16, wherein the identifying the item pair in the pair list further comprises:
   determining whether the similarity index indicates that the current pair should be inserted in a global pair list; and
   in response to a determination that the similarity index indicates that the current pair should be inserted in the global pair list, inserting the current pair in the global pair list.
18. The non-transitory computer-readable storage medium of claim 16, wherein the identifying the item pair in the pair list further comprises:
   determining whether the similarity index indicates that the current pair should be inserted in a pair list of the item; and
   in response to a determination that the similarity index indicates that the current pair should be inserted in the pair list of the item, inserting the current pair in the pair list of the item.
19. The non-transitory computer-readable storage medium of claim 13, wherein the generating the plurality of relational similarity indexes comprises:
   determining a maximum number of terms to include from a pair list of the item;
   identifying a plurality of common terms in the pair list of the item, wherein
      a number of the plurality of common terms in the pair list of the item is less than the maximum number of terms; and
   storing the number in a relational similarity index.

20. The non-transitory computer-readable storage medium of claim 12, wherein the method further comprises:
generating a plurality of item identifiers, wherein
the ranking values of the first list of ranking values and the ranking values of the second list of ranking values are stored in a data structure that associates one or more terms of the plurality of terms of the item with one or more terms of the plurality of terms in the reference item, and
the generating comprises
the performing the hash operation on each item of a plurality of items; and
grouping a plurality of items into one or more groups of items, using classification information generated by the classification engine, wherein
the plurality of items comprises the item.

\* \* \* \* \*